United States Patent
Balan et al.

(10) Patent No.: US 11,696,197 B2
(45) Date of Patent: Jul. 4, 2023

(54) DETERMINATION FOR CONDITIONAL HANDOVER FAILURE

(71) Applicant: Nokia Technologies Oy, Espoo (FI)

(72) Inventors: Irina-Mihaela Balan, Munich (DE); Andreas Lobinger, Grafing (DE); Guillaume Decarreau, Munich (DE); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 114 days.

(21) Appl. No.: 16/971,370

(22) PCT Filed: Mar. 12, 2018

(86) PCT No.: PCT/FI2018/050175
§ 371 (c)(1),
(2) Date: Aug. 20, 2020

(87) PCT Pub. No.: WO2019/175463
PCT Pub. Date: Sep. 19, 2019

(65) Prior Publication Data
US 2021/0029600 A1    Jan. 28, 2021

(51) Int. Cl.
*H04W 36/00* (2009.01)
*H04W 36/30* (2009.01)

(52) U.S. Cl.
CPC . *H04W 36/00837* (2018.08); *H04W 36/0058* (2018.08); *H04W 36/0094* (2013.01); *H04W 36/305* (2018.08)

(58) Field of Classification Search
CPC ......... H04W 36/00837; H04W 36/305; H04W 36/0058; H04W 36/0094
(Continued)

(56) References Cited

U.S. PATENT DOCUMENTS 9,155,014 B2    10/2015   Tenny et al.
2014/0087729 A1    3/2014   Olofsson et al.
(Continued)

FOREIGN PATENT DOCUMENTS

| EP | 3054725 A1 | 8/2016 |
|---|---|---|
| KR | 20170114258 A | * 3/2017 |
| WO | 2018/028969 A1 | 2/2018 |

OTHER PUBLICATIONS

Extended European Search Report received for corresponding European Patent Application No. 18909323.0, dated Nov. 3, 2021, 11 pages.
(Continued)

*Primary Examiner* — Faisal Choudhury
(74) *Attorney, Agent, or Firm* — Brake Hughes Bellermann LLP

(57) ABSTRACT

There is provided a method comprising: upon detecting that a first condition is met, causing a transmission of a measurement report to a wireless network; acquiring a conditional handover command from the wireless network; upon detecting that a second condition, associated with the conditional handover command, is met, starting a handover execution timer for triggering execution of a handover from a source cell to a target cell; detecting that a radio link failure condition is met before the execution of the handover is triggered; and on the basis of the detecting, signaling, to the wireless network, information indicative of a cause of a conditional handover failure to be either misconfigured first condition or misconfigured second condition.

17 Claims, 7 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2015/0092746 | A1* | 4/2015 | Jang | H04W 36/0094 370/331 |
| 2015/0358864 | A1 | 12/2015 | Park et al. | |
| 2016/0112924 | A1 | 4/2016 | Turakhia et al. | |
| 2016/0302117 | A1 | 10/2016 | Inoue et al. | |
| 2019/0387440 | A1* | 12/2019 | Yiu | H04W 36/165 |
| 2020/0022042 | A1* | 1/2020 | Yin | H04W 36/00837 |
| 2020/0045602 | A1* | 2/2020 | Jiang | H04W 36/0058 |
| 2020/0396660 | A1* | 12/2020 | Wu | H04W 76/30 |

OTHER PUBLICATIONS

"Analysis on conditional handover", 3GPP TSG-RAN WG2 #97bis, R2-1703384, Agenda : 10.2.4.4, Huawei, Apr. 3-7, 2017, 7 pages.

"Operational aspects of conditional handover mechanism", 3GPP TSG-RAN WG2 #100, R2-1713857, Agenda 10.2.11, Samsung, Nov. 27-Dec. 1, 2017, 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.0.0, Dec. 2017, pp. 1-338.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.0.1, Jan. 2018, pp. 1-776.

International Search Report and Written Opinion received for corresponding Patent Cooperation Treaty Application No. PCT/FI2018/050175, dated Jun. 26, 2018, 17 pages.

"Discussion on Conditional Handover in NR", 3GPP TSG-RAN WG2 Meeting #101, R2-1802008, Agenda : 10.2.7, ASTRI, Feb. 26-Mar. 2, 2018, pp. 1-6.

"Timer Based Approach for Detection of Misconfigured Threshold of a Dual Threshold Event", 3GPP TSG RAN WG3 Meeting #81, R3-131318, Agenda : 10.3.1, NSN, Aug. 19-23, 2013, 4 pages.

Park et al., "Handover Mechanism in NR for Ultra-Reliable Low-Latency Communications", IEEE Network, vol. 32, No. 2, Mar.-Apr. 2018, pp. 41-47.

Office action received for corresponding Indian Patent Application No. 202047043904, dated Aug. 31, 2021, 8 pages.

\* cited by examiner

DETERMINATION FOR CONDITIONAL HANDOVER FAILURE

RELATED APPLICATION

This application was originally filed as a Patent Cooperation Treaty Application No. PCT/FI2018/050175 filed on Mar. 12, 2018, each of which is incorporated herein by reference in its entirety.

TECHNICAL FIELD

The invention relates to communications.

BACKGROUND

In a communication network, handovers are performed to change serving cell(s) of terminal devices. For example, user moving from one cell to another may trigger handover. Conditional handover(s) may be used to further enhance the handover execution. It may be beneficial to provide solutions which aim to better measure performance of conditional handovers, and possibly determine cause of conditional handover failures.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth (e.g. Bluetooth Low Energy), personal communications services (PCS), ZigBee, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
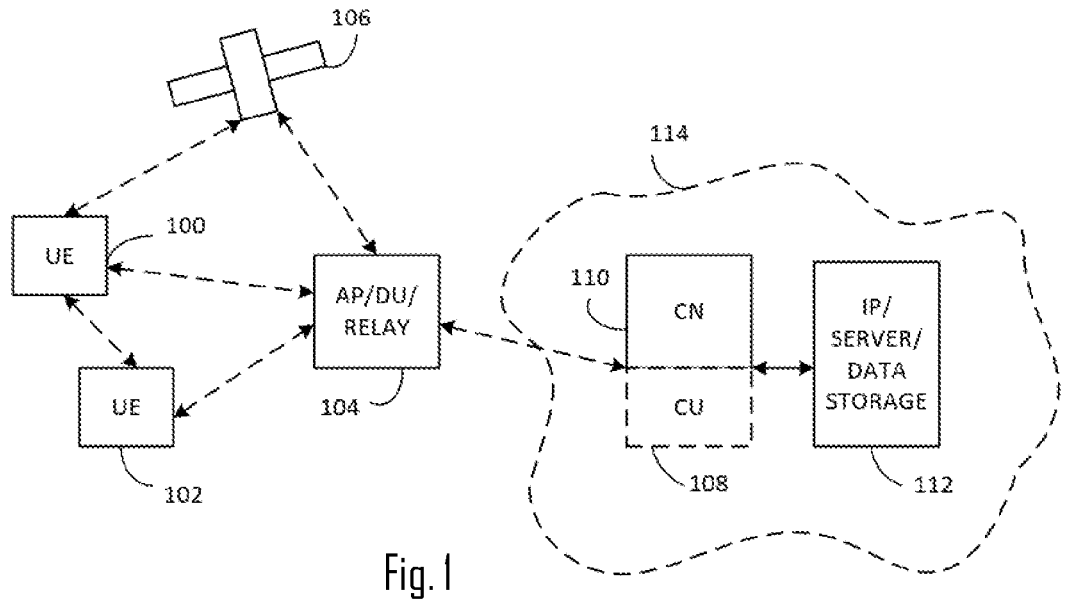
FIG. 1 illustrates an example of a wireless network to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties.

The example of FIG. 1 shows a part of an exemplifying radio access network. Referring to FIG. 1, user devices 100 and 102 may be configured to be in a wireless connection on one or more communication channels in a cell with an access node, such as (e/g)NodeB, 104 providing the cell. The physical link from a user device to the access node 104 is called uplink or reverse link and the physical link from the access node 104 to the user device is called downlink or forward link. It should be appreciated that access node 104 or nodes or their functionalities may be implemented by using any node, host, server or access point etc. entity suitable for such a usage. The term (e/g)NodeB used above may refer to eNodeB (i.e. eNB) and/or gNodeB (i.e. gNB), for example.

A communications system typically comprises more than one access node (e.g. similar as access node 104) in which case the access nodes may also be configured to communicate with one another over links, wired or wireless, designed for the purpose. These links may be used for signaling purposes. The access node may be a computing device configured to control the radio resources of communication system it is coupled to. Access node, such as the access node 104, may also be referred to as a base station, an access point, network node, network element or any other type of interfacing device including a relay station capable of operating in a wireless environment. Access node includes or is coupled to transceivers. From the transceivers of the access node, a connection is provided to an antenna unit that establishes bi-directional radio links to user devices. The antenna unit may comprise a plurality of antennas or antenna elements. The access node 104 is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device, such as user devices 100 and 102 (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, Machine Type Communication (MTC) device, and/or vehicular user device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of access nodes, such as (e/gNodeBs), the user device may have an access to a plurality of radio cells and the system may comprise also other apparatuses, such as physical layer relay nodes or other network elements, etc. At least one of the access nodes may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The access nodes of FIG. 1 may provide any kind of these cells. A cellular radio system may be implemented as a multilayer network including several kinds of cells. Typically, in multilayer networks, one access node provides one kind of a cell or cells, and thus a plurality of access nodes are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In wireless networks, such as cellular networks, handover mechanism is responsible for assuring the mobility of the users. As the user is moving out of the coverage of the serving cell it may be switched to a different cell (i.e. handover of a terminal device from a source cell to a target cell). This is usually a network driven UE assisted procedure. Basic handover (BHO) (e.g. in LTE, 5G) starts with an event triggered measurement report (MR) that the UE sends to its source cell (i.e. meaning the entity providing the cell, e.g. network element 104). The event refers for example to cell signal strength: target cell may be offset better than source cell for a given Time to Trigger (TTT). I.e. the target cell may be offset better for the duration of the TTT. Upon reception of such a measurement report, the source cell may prepare a handover to a target cell (e.g. based on the content of the measurement report and possible other information). If the preparation is successful, a handover command may be sent to the UE. As soon as the UE receives the handover command, it may attempt to access the target cell based on configuration contained in the handover command.

So called conditional handover (CHO) may be used to enhance the BHO. CHO is a new procedure introduced in the 5G. In CHO, the preparation of the handover may be similar to the BHO procedure. However, upon receiving the handover command, the UE may not immediately try to access the target cell. Instead, the UE may monitor if a condition is fulfilled (e.g. CHO condition or Event 2) and only then attempt to access the target cell. This condition could be for example that the signal strength of the target cell is above a given threshold. For example, the condition may need to be true for a given TTT in order to trigger the handover execution. Hence, there may be one set of rules (e.g. one condition) for triggering the measurement report transmission and another set of rules (e.g. one condition) for triggering the execution of the handover. The basic idea of CHO may be to reduce the number of radio link failures (RLFs) during handover compared to BHO. Such failures may be due to UE missing the handover command (or failing to successfully send the MR) in the source cell, or UE failing to access the target cell. In other words, CHO is trying to solve the issues of the BHO by allowing UE to receive the HO command a bit earlier than with BHO (i.e. when communication with the source is still safe) and to access the target cell a bit later than in case of BHO (when communication with the target is already safe), hence lowering the risk of failures (RLF or handover failure) during handover. The CHO is expected to improve the HO robustness of both LF and HF bands.

As with BHO, it is expected that CHO as well will benefit from the introduction of mobility robustness optimization (MRO) mechanisms. More precisely, methods of detecting and reporting too late CHO, too early CHO or CHO to wrong cell may be beneficial to be introduced. Such mechanisms may help to have the CHO correctly parametrized in order to avoid/reduce RLFs, handover failures and ping-pongs, and also that resources are not wasted (both signaling and radio in target cell). Hence, it may be beneficial to provide solutions which enable detecting which misconfiguration of the CHO leads or led to handover failure. Based on this information, the network may configure parameter(s) of the CHO, thus reducing the failed handovers, and thus improving the user service.

Figure 2:
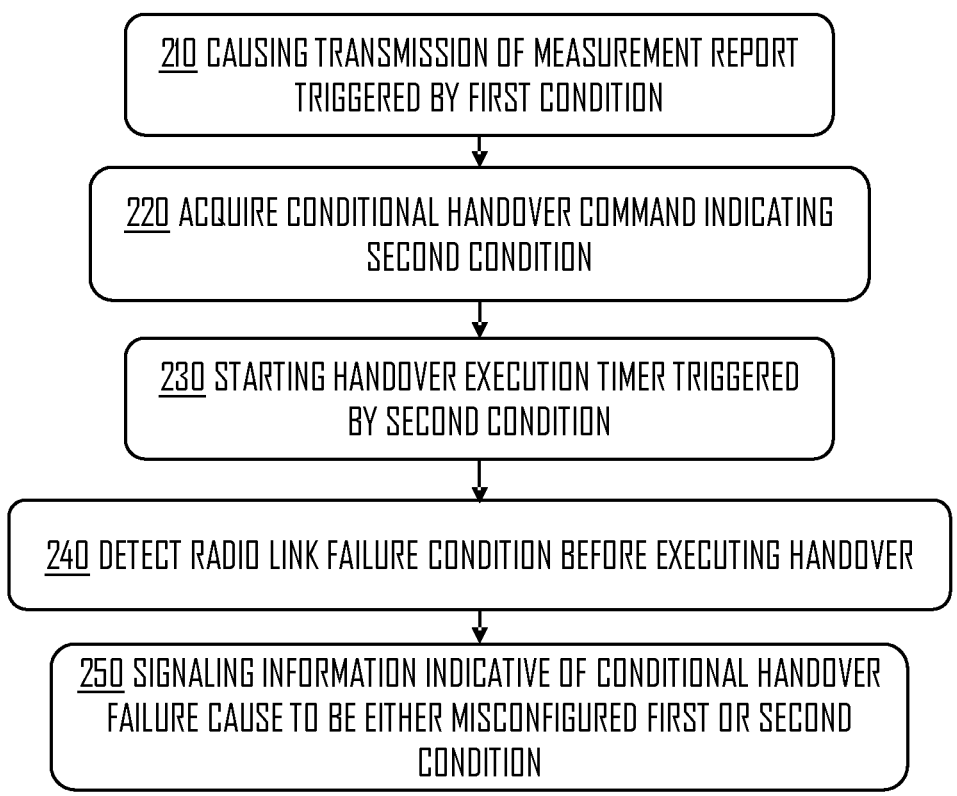
FIGS. 2 and 3 illustrate flow diagrams according to some embodiments.

FIG. 2 illustrates a flow diagram according to an embodiment. Referring to FIG. 2, a method in a terminal device is shown and comprises: upon detecting that a first condition is met, causing a transmission of a measurement report to a wireless network (block 210); acquiring a conditional handover command received from the wireless network (block 220); upon detecting that a second condition, associated with the conditional handover command, is met, starting a handover execution timer for triggering execution of a handover from a source cell to a target cell (block 230); detecting that a radio link failure condition is met before the execution of the handover is triggered (block 240); and on the basis of the detecting, signaling, to the wireless network, information indicative of a cause of a handover failure to be either misconfigured first condition or misconfigured second condition (block 250).

The method may be performed by a terminal device, such as the terminal device 100 or 102, or by one or more circuitries of a terminal device. The wireless network may be the network discussed with respect to FIG. 1. Thus, the MR may be sent to, for example, source cell providing network entity (e.g. network element 104). The network element 104 may be referred to as a network element, network node or access node in this disclosure. As the different functions of the conventional access nodes may be shared between different operational entities, the use of different terms is justified. The skilled person understands that the node 104 is for enabling the communication between the UEs and the core network, wherein the node 104 may be a part of the core network or a separate from the core network.

The second condition triggering the performing of block 230 may be indicated by and/or be comprised in the conditional handover command acquired in block 220, for example. In another example, the second condition is indicated by a separate message to the UE. In yet one embodiment, the second condition is preconfigured to the terminal device. Hence, the conditional handover command may not necessarily indicate the second condition.

Figure 3:
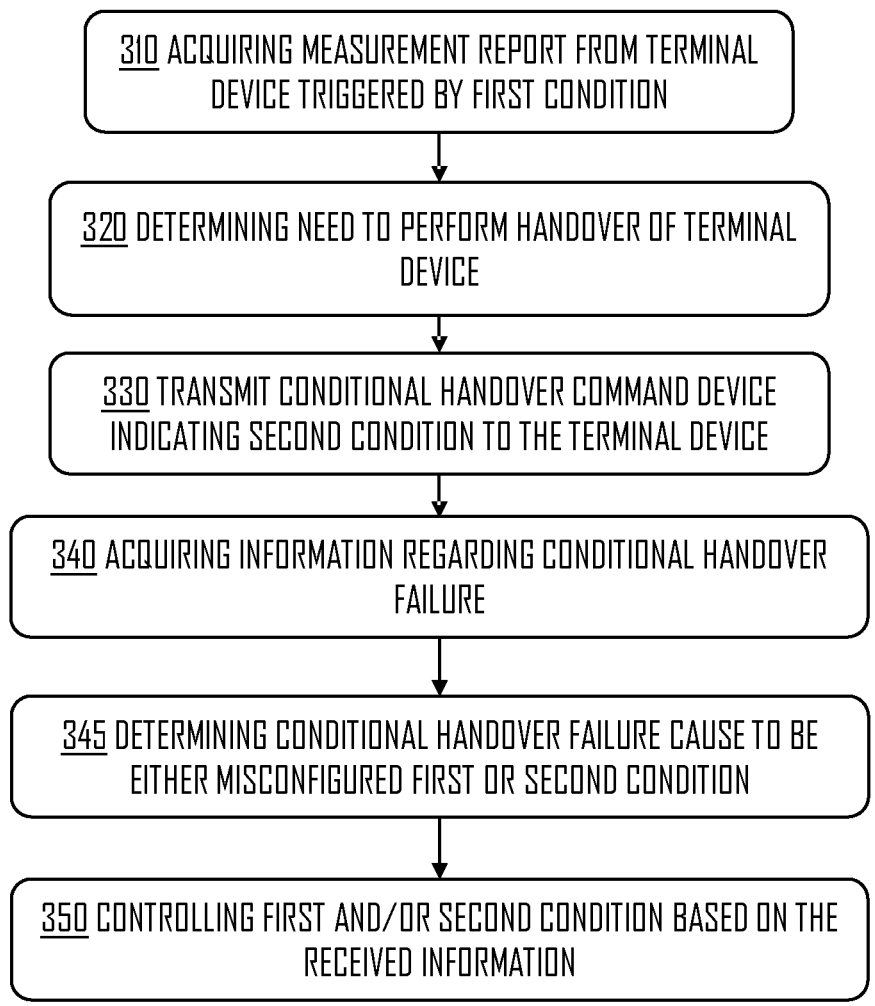

FIG. 3 illustrates a flow diagram according to an embodiment. Referring to FIG. 3, a method in a network node of a wireless network (e.g. network of FIG. 1) is shown and comprises: acquiring a measurement report received from a terminal device, the transmission of the measurement report being by meeting a first condition (block 310); determining, based on the measurement report, a need to perform a handover of the terminal device from a source cell to a target cell (block 320); causing a transmission of a conditional handover command to the terminal device, the conditional handover command indicating a second condition for triggering execution of the handover from the source cell to the target cell (block 330); acquiring, from the terminal device, information regarding a conditional handover failure (block 340); determining, based on the acquired information, a cause of the conditional handover failure to be either misconfigured first condition or misconfigured second condition (block 345); and controlling at least one of the first condition, the second condition based on the received information (block 350).

The method may be performed by a network node, such as the network element 104 which may be a network node, for example. The method may be performed by a circuitry in a network node, for example.

Figure 4:
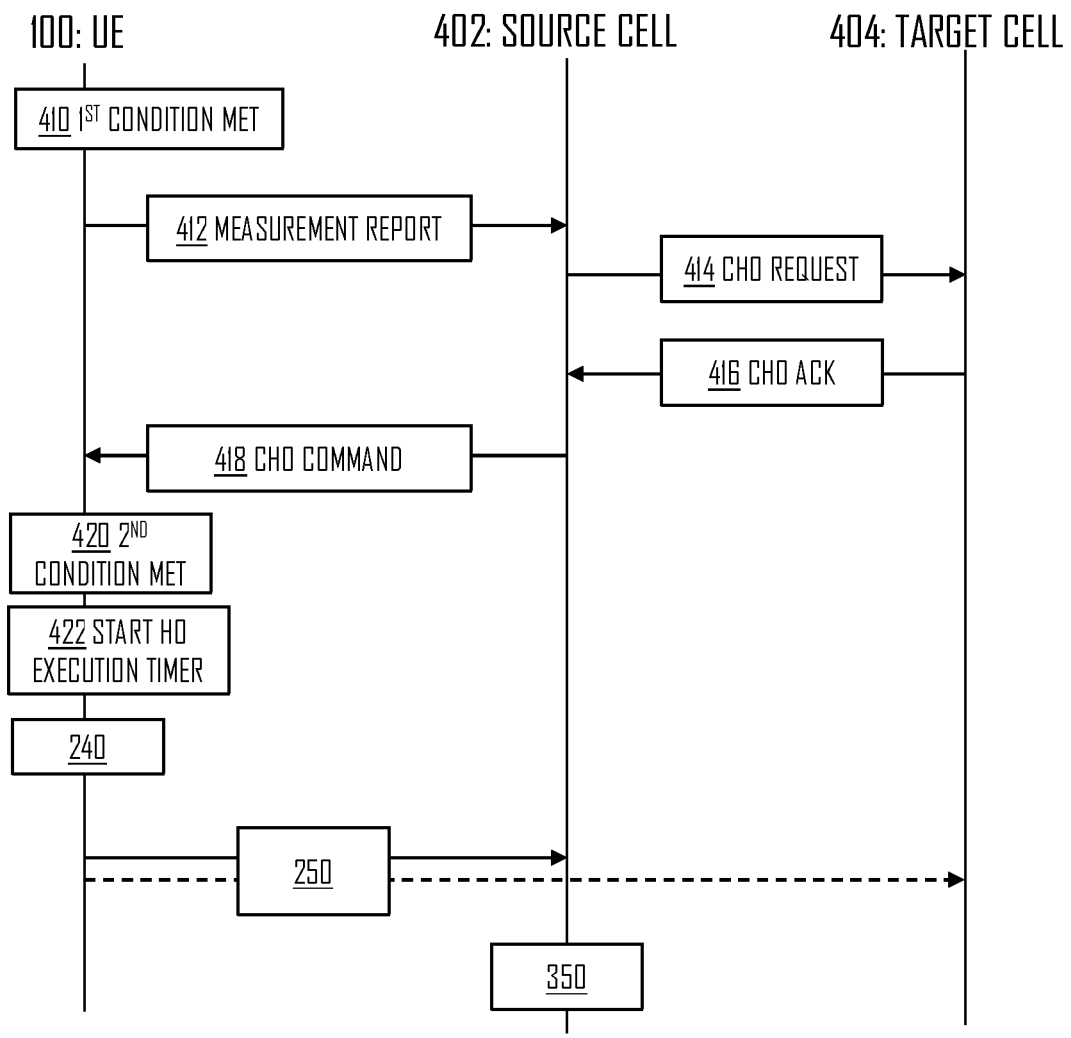
FIG. 4 illustrates a signal diagram according to an embodiment.

Let us then look FIG. 4 illustrating an embodiment. Referring to FIG. 4, actions between UE 100 (i.e. called UE or terminal device 100) and source cell 402 are shown. Additionally, there may be communication between source and target cells 402, 404 as will be later discussed in more detail.

In block 410, the UE 100 (or some other, but the example is discussed using UE 100) detects that a first condition (or first set of rules) is met. Various different triggers may be utilized one being signal strength threshold. That is, if signal strength measured by the UE 100 exceeds a certain threshold, it may trigger the transmission of measurement report (block 412) to the source cell 402.

As discussed with reference to FIGS. 2 and 3, in block 418, the UE 100 may receive the CHO command in response to transmitting the MR to the source cell 402. The CHO command may indicate a second condition (or second set of rules) to the UE 100. The UE 100 may then automatically and continuously monitor whether the second condition is met. In block 420, the UE 100 may detect that the second condition is met and based on the detection, trigger, in block 422, the handover execution timer. After certain time period (e.g. TTT), the CHO may be executed if the second condition is still true at the expiry of the handover execution timer. It is noted that other type of timers may be used, but one example may be the TTT. For example, the handover execution timer may be referred to as Event 2 TTT or TTT of Event 2. However, in this specific example, the handover execution timer has not yet expired when the UE 100 detects that the RLF condition is true (block 240). Process may then continue to block 250 in which indication to the source cell 420 and/or to the target cell 404 is transmitted by the UE 100 about the RLF condition. As discussed above, the message of block 250 may be indicative of which of the two conditions is misconfigured and possibly caused the RLF condition being true. In block 350, the source cell 402 may control the parameters of the CHO. For example, the misconfigured condition may be changed and/or controlled.

It is possible that the source cell 402 transmits a CHO request to the target cell candidate(s) 404 after and/or in response to receiving the MR from the UE 100 (block 414).

If the target cell 404 accepts the request, acknowledgement may be transmitted to the source cell 416. If non-acknowledgement is received, the target cell may be changed, for example, and another request may be transmitted to acknowledge the CHO procedure.

It is noted that triggering the MR transmission may be referred to as Event 1 and triggering the execution of the CHO may be referred to as Event 2. According to an embodiment, the detecting, by the UE 100, that the radio link failure condition is met comprises detecting an expiry of a radio link failure related timer. This may happen after a predetermined number of out-of-syncs was detected at lower layer, for example. So, in block 240 the UE 100 may detect that RLF related timer expires, and thus RLF is declared.

Figure 5:
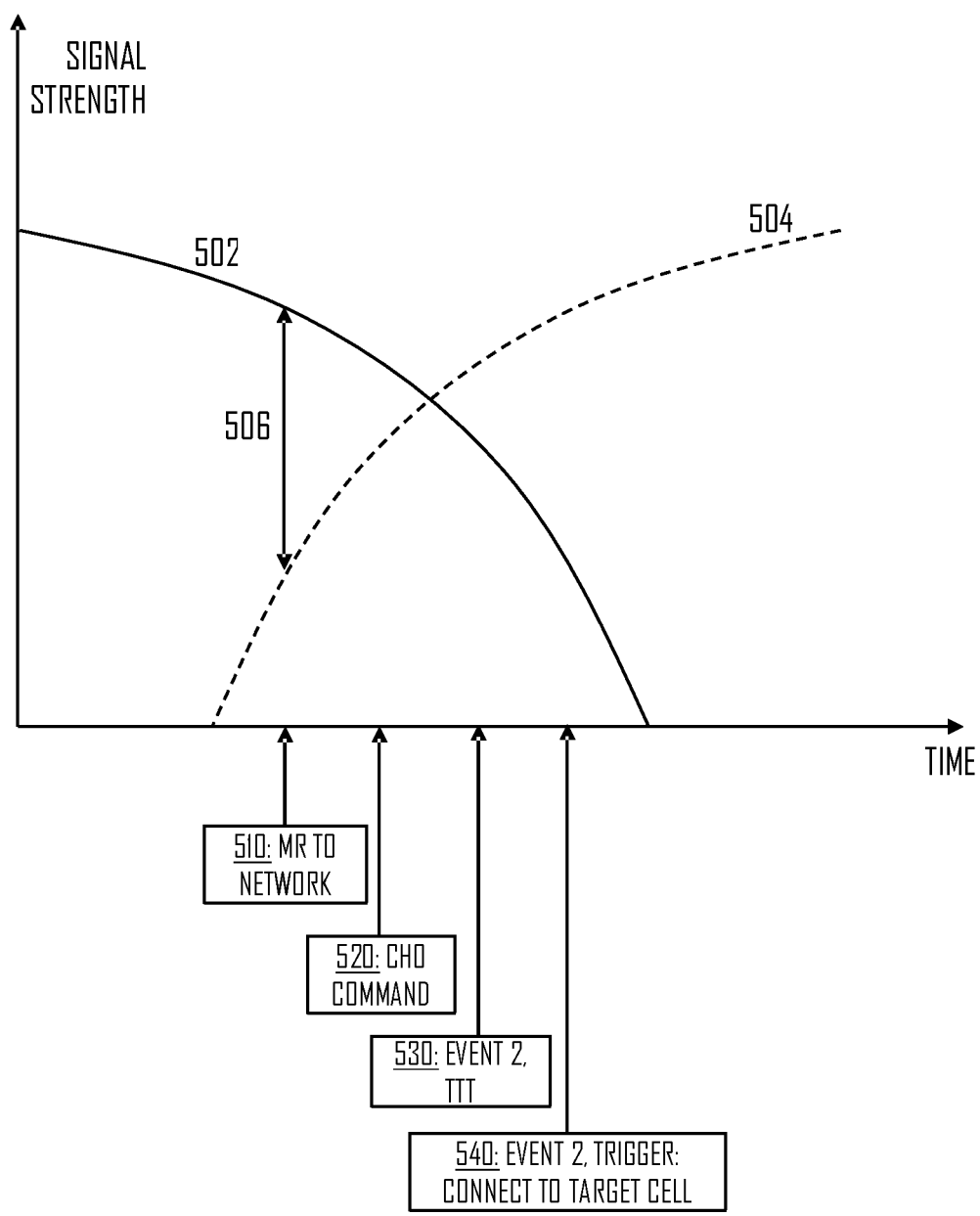
FIGS. 5, 6, 7A, and 7B illustrate some embodiments.

FIG. 5 illustrates an embodiment in which signal strength is used as one MR triggering criterion. Referring to FIG. 5, curve 502 indicates measured signal strength of source cell and curve 504 indicates measured signal strength of target cell. Signal strength may be measured and/or indicated using Reference signal received power (RSRP) for example.

In block 510, the UE 100 may transmit the MR to the network as the difference 506 between signal strength of the source and target cells may exceed a threshold. I.e. the difference 506 may meet the first condition. However, as this may be CHO event, the handover may not immediately commence as the source cell may still be better than the target cell and also, because the source cell may need to negotiate the HO with the target cell, and inform the UE 100 if a CHO is to be started at all (i.e. CHO command). The UE 100 may not perform any handover related activities before the CHO command is acquired.

In block 520, the UE 100 may receive the CHO command from the network, as discussed above. If the second condition indicated in the command is met, in block 530, the HO execution timer may be started. In block 540, if no RLF is experienced or RLF condition is not met, the handover execution may continue by the UE connecting to the target cell. However, before block 540, an RLF may be experienced and the method may thus continue as indicated above, e.g. blocks 240, 250.

According to an embodiment, the radio link failure related timer is started in response to detecting at least one out-of-sync event. Example of this may be shown in FIG. 6 in which the RLF related timer may be started (block 620) after the MR is transmitted to the network (i.e. block 610). Block 610 may further comprise communication about the CHO between the source and target cells. The RLF related timer may be triggered at time instant T1. If RLF related timer is not used, the RLF related condition may be, for example, detection that RLF has happen (e.g. no connection to source cell and hence the UE 100 may enter idle mode). The RLF related timer may be, for example, T310 which is started when UE detects physical layer related problems, i.e. when UE receives N310 consecutive out-of-sync indicators from lower layers (e.g. at T1). The RLF related timer may expire at T4, i.e. the duration of the RLF related timer may be indicate with arrow 608.

According to an embodiment, control plane communication may still be possible at the time when the radio link failure related timer (e.g. T310) is started in block 620. That is, control plane communication between the UE 100 and the source cell may still be possible.

According to an embodiment, the radio link failure related timer (e.g. T310) is started before acquiring the conditional handover command over a control plane. I.e. at that time the control plane communication was still possible. The T310 timer may be started on the UE side early enough so that the Control Plane (C-Plane) communication is still possible and thus UE is able to receive the CHO command (block 630). It may be even more likely that such a situation is beneficial in 5G due to the introduction of in-sync/out-of-sync Block Error Rate (BLER) threshold pairs for RLF detection.

Figure 6:
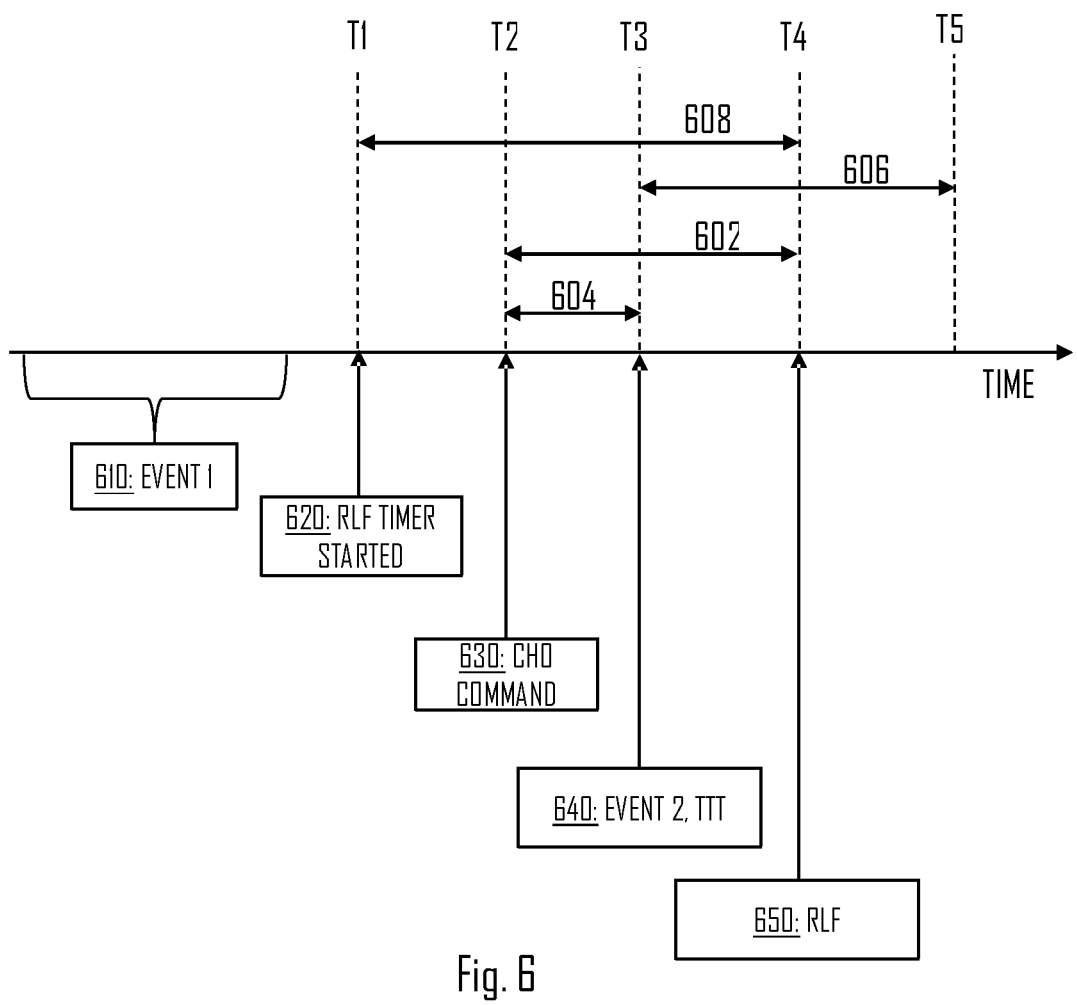

Referring to an embodiment of FIG. 6, at T2 the CHO command may be transferred from the network to the UE (block 630).

At T3, the HO related timer may be started as the second condition is met (block 640).

Now, at T4 the RLF related timer may expire and thus RLF condition may be met (block 650). This may mean that the UE 100 has experienced RLF. I.e. the handover may fail as the RLF condition is met. Thus, the process may continue to block 250 in which the UE 100 may transmit the information indicative of the conditional handover failure to the network once the UE 100 has re-established communication with the network. It is noted that the UE 100 may need to perform the re-establishment to the network via random access procedure as the RLF is experienced. For example, the UE 100 may re-establish with the target cell, and thus transmit the conditional handover failure cause indicating information (e.g. information 700 discussed below) to the target cell or to the entity controlling the target cell. Thus, the information is not necessarily transmitted to the source cell (or to the entity providing the source cell). However, this may also be possible. After reconnecting to the network, the information (i.e. block 250) may be transmitted, by the UE 100, to the network, and the network may perform controlling of block 350 based at least on the received information.

It is further noted that if the RLF related timer would not expire and/or trigger (i.e. at T4) the actions of block 250, the CHO process may continue to the actual handover execution at time instant T5. I.e. the UE 100 would then perform the steps of the handover. This may mean that the UE 100 connects via random access procedure to the target cell.

So, the information about the misconfigured parameter (i.e. Event 1 or Event 2) may happen, for example, in the following scenario: the UE 100 is connected to a first cell, and a second cell is prepared for CHO. The UE experiences an RLF in the first cell before CHO can be completed (Event 2 was not triggered at T5, but timer may be running from T3). Then the UE may re-establish connection in the second cell. Question may be was Event 1 or Event 2 triggered too late?

Figure 7A:
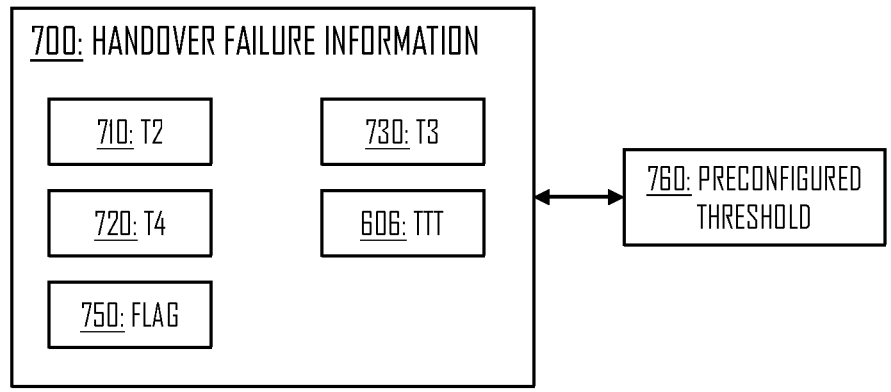
Figure 7B:
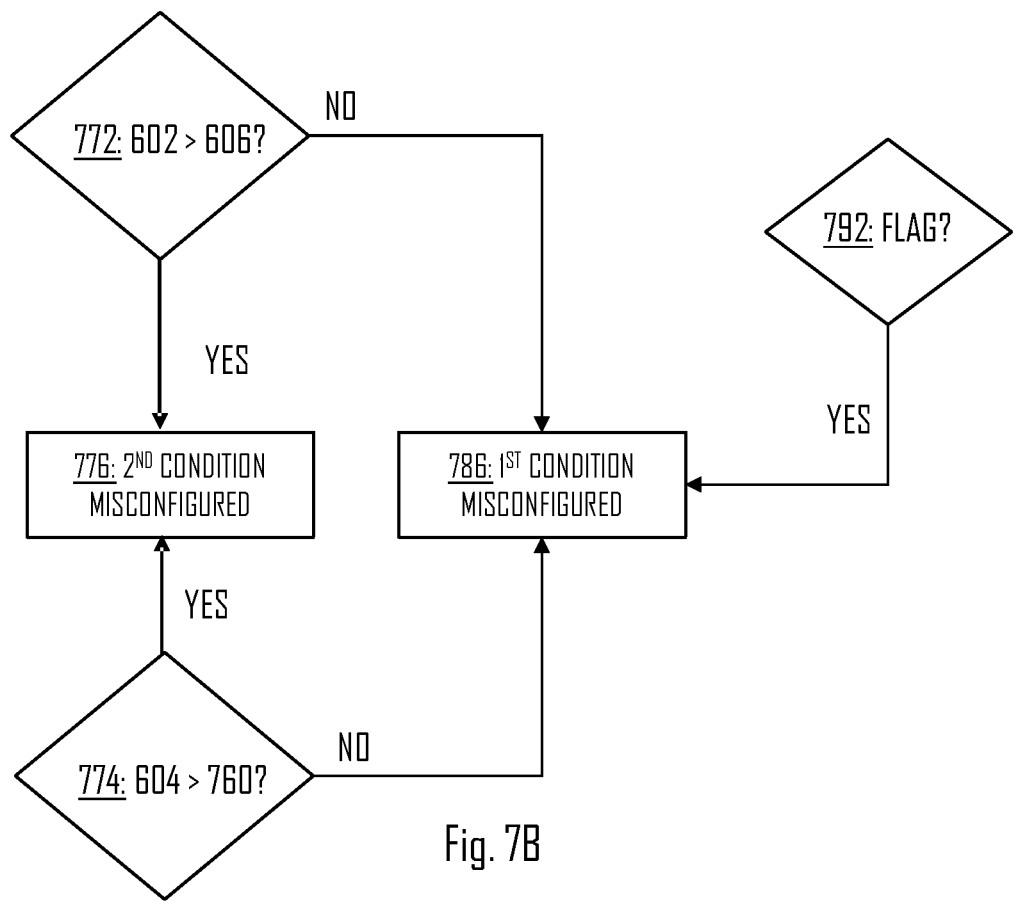

Let us look embodiments of FIGS. 7A and 7B. Referring to FIG. 7A, the information indicative of the cause of the conditional handover failure (i.e. transmitted in block 250) may be referred to as handover failure information 700 or conditional handover failure information.

According to an embodiment, the information 700 comprises timing information 710, 720, 730, 606 indicating the cause of the conditional handover failure (i.e. Event 1 or Event 2 condition/parameter misconfiguration).

In an embodiment, the timing information is indicative of (1) a first time period 602 between the detecting that the radio link failure condition is met and the acquiring the conditional handover command (see FIG. 6, time between T2 and T4), and/or (2) a second time period 604 between the starting the handover execution timer and the acquiring the conditional handover command (see FIG. 6, time between T2 and T3).

The first and/or second time periods 602, 604 may be indicated in many different ways in the information 700. For example, the information 700 comprises information element 710 indicating T2 and information element 720 indicating T4. It is equally possible that the information 700 indicates directly the first time period 602, and thus the network side element may not need to calculate the time period 602 based on elements 710, 720.

In case the second time period 604 is indicated in the information 700, the information 700 may comprise an information element 730 indicating T3 and also the information element 710. However, it is equally possible that the information 700 directly indicates the second time period 604.

As noted the information 700 may indicate one or both the first time period 602 and the second time period 604.

According to an embodiment, the timing information further indicates duration of the handover execution timer 606. As explained, the timer may be TTT timer which expires at T5. So, the timer duration 606 may be between T3 and T5. Duration here may mean the initial time on the timer or the remaining time on the timer. However, it is noted that in some cases the timer duration 606 is preconfigured and thus the network may already know/determine the timer duration 606. Hence, it may not be always necessary to transmit the timer duration 606 with the information 700 from the UE 100 to the network. In some cases, the UE 100 scales the Event 2 TTT based on its speed. Hence, it may be beneficial to indicate this to the network as it may be different depending on the speed of the UE 100.

Let us then look at FIG. 7B on how this timing information may be used to determine which of the Events 1 and 2 was/is misconfigured. At block 772, the network, such as the network node 104, may determine whether the first time period 602 is equal and/or greater than the HO execution timer duration 606 (e.g. T4−T2>TTT of Event 2). If yes, the network may determine that the second condition (i.e. the Event 2) is/was misconfigured (block 776). For example, if T4−T2 is larger than TTT, this may mean that if TTT had been started earlier, there would have no problem. Hence, the condition for triggering TTT may be wrong.

Similarly, in block 774, if the second time period (e.g. T3−T2) is equal and/or greater than a preconfigured threshold 760, the network may determine that the second condition (i.e. the Event 2) is/was misconfigured (block 776). The value of the preconfigured threshold 760 may be network configured.

If the method proceeds to block 776, it may mean that the second condition (i.e. the Event 2) is triggered too late and should have been triggered earlier. Hence, the network may continue to adjust the second condition parameters so that the Event 2 is triggered earlier in the system. Note that this may mean that Event 1 is triggered at the right time and hence it may be beneficial to leave Event 1 parameters untouched.

If determination of blocks 772 and/or 774 is negative, the method may proceed to block 786 in which it may be determine that the first condition (i.e. Event 1) is/was misconfigured. This may be indicated by (1) the first time period 602 being equal to and/or less than the duration of the handover execution timer 606, (2) the second time period 604 being equal to and/or less than a preconfigured threshold 760. E.g. if T4−T2 is smaller than Event 2 TTT, this may mean that TTT would never expire before T4 (as the TTT condition is received at T2 and this triggers the measurement(s) by the UE 100). Hence, Event 1 should start earlier to start Event 2 TTT sooner.

It is noted that in blocks 772 and 774 the determination is indicated to comprise detecting whether time period 602 is greater than timer duration 606 and time period 604 is greater than the threshold 760. However, it may be left to implementation details whether the determination is limited to only 'greater than' or 'equal or greater than' determination. So, if time period 602 equals to time duration 606, in some implementations this may mean that the block 776 is performed and in some implementations block 786 is performed, for example.

According to an embodiment, additionally or alternatively the information 700 comprises an indicator 750, such as flag. The indicator 750 may indicate whether or not a first measurement performed by the UE 100, on the basis of the conditional handover command or after acquisition of the conditional handover command (e.g. block 220), causes starting the handover execution timer. So, when the UE 100 receives the CHO command, the UE 100 may start to perform measurement(s) to detect whether the second condition is met or not. If the first measurement performed in response to the CHO command or after acquisition of the conditional handover command triggers the HO execution timer, the UE 100 may indicate this by the indicator 750. The indicator 750 may be transmitted if the RLF condition is true. If the Event 2 TTT starts with the first measurement, it may be a clear indication that the Event 1 was too late as Event 2 could not trigger earlier. Hence, the first condition may be misconfigured and consequently MR transmitted too late. First measurement here may literally mean the first measurement performed by the UE 100 on basis of the conditional handover command or after acquisition of the conditional handover command, i.e. the flag may not be triggered if the UE 100 needs to perform more than one measurement before the second condition is determined to be met.

The indicator 750 may be used in addition or as an alternative for the time period 602 and/or time period 604. Hence, in block 792 the network may determine whether the indicator 750 of the information 700 indicates that the first measurement has triggered the Event 2 TTT. This may be indicated by raising a flag, for example. If yes, the network may determine that the first condition is misconfigured (block 786). If there is no flag or indicator, or the indicator 750 indicates that the first measurement did not start the Event 2 TTT, this may not necessarily mean that the second condition is misconfigured. However, according to an embodiment, the process may be configured in such way that this is true. Hence, the solution may be as simple as using a flag to indicate which of the misconfigured conditions (i.e. Event 1 or Event 2) caused the RLF, and consequently HO failure. So, there may be no need to transmit the timing information in all embodiments.

However, it may be equally possible to utilize more than one of the indicated methods for determining the cause of the conditional handover failure. Hence, determination of more than one of the blocks 772, 774, 792 may need to indicate the same culprit for the conditional handover failure before the network starts to reconfigure parameter(s) of Event 1 and/or Event 2. For example, both blocks 772, 774 may need to indicate that the second condition is/was misconfigured before the second condition is changed. Different choices should be clear to the skilled person based on this disclosure.

The transfer of information 700 in block 250 from the UE 10 to the network, and between different network nodes of the network can be done by slightly modifying the already existing messages defined for Mobility Robustness Optimization (MRO) by adding them to the RLF report, sent to the target cell via the UE Information Response message. The information can be then sent from the target cell to the source cell via the HO report. One clear advantage the proposed solution is that the right event culpable for a too late CHO can be identified which is not possible with legacy MRO methods which have to look at a single event configuration. This provides a sufficient advantage over the known solutions.

The second condition (i.e. Event 2), as indicated, may comprise a measurement threshold (e.g. signal strength) that causes starting of the timer (e.g TTT). Hence, the second condition may comprise both the measurement threshold and the timer. So, if the second condition (i.e. the Event 2) is determined to be misconfigured, the network may, for example, control one or both the timer and the measurement threshold. For example, the measurement threshold may be adjusted such that the timer may be started earlier. On the other hand the duration of the timer may be made shorter to trigger the handover execution earlier. The measurement threshold may be, for example, related to the target cell, e.g. if signal strength of the target cell exceeds a threshold the timer is started. On the other hand it may be related to difference and/or relation of signals strength of the source cell and the target cell.

In an embodiment, based on determining the cause of the conditional handover failure to be either the misconfigured first condition or the misconfigured second condition, reconfiguring the condition that is determined to be the cause of the conditional handover failure may take place. E.g. if Event 1 is determined to be misconfigured, the first condition may be adjusted or if Event 2 is determined to be misconfigured, the second condition may be adjusted.

In an embodiment, HO execution timer is TTT of Event 2.

Figure 8:
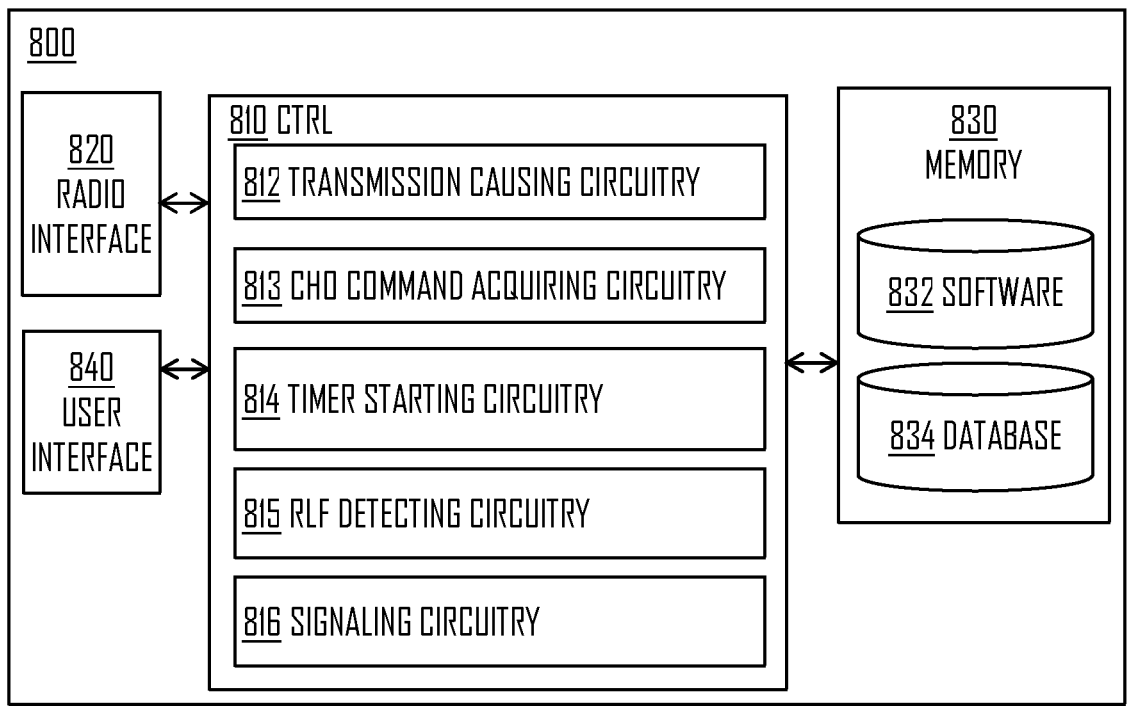
FIGS. 8 and 9 illustrate apparatuses according to some embodiments.
Figure 9:
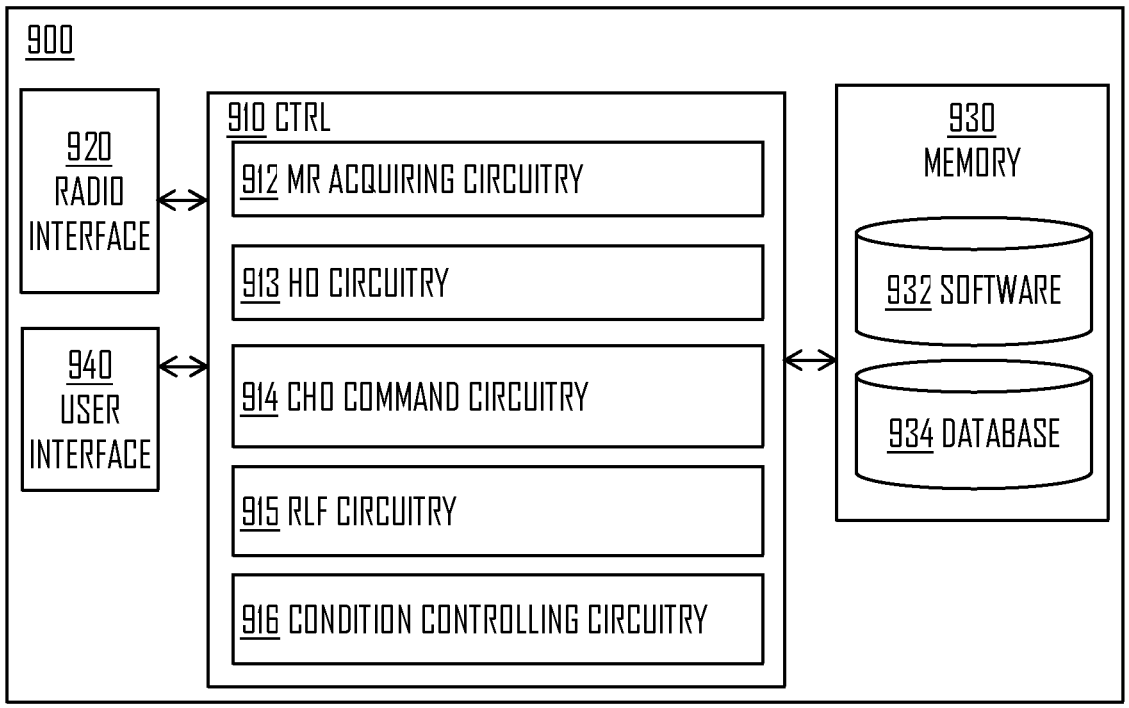

FIGS. 8 and 9 provide apparatuses 800, 900 comprising a control circuitry (CTRL) 810, 910, such as at least one processor, and at least one memory 830, 930 including a computer program code (software) 832, 932, wherein the at least one memory and the computer program code (software) 832, 932, are configured, with the at least one processor, to cause the respective apparatus 800, 900 to carry out any one of the embodiments described above, such as with reference to FIGS. 2 to 7B, or operations thereof.

Referring to FIGS. 8 and 9, the memory 830, 930 may be implemented using any suitable data storage technology, such as semiconductor based memory devices, flash memory, magnetic memory devices and systems, optical memory devices and systems, fixed memory and removable memory. The memory 830, 930 may comprise a database 834, 934 for storing data. Data may comprise, for example, the information 700 and/or preconfigured threshold 750.

The apparatus 800, 900 may further comprise radio interface (TRX) 820, 920 comprising hardware and/or software for realizing communication connectivity according to one or more communication protocols. The TRX may provide the apparatus with communication capabilities to access the radio access network and enable communication between network nodes, for example. The TRX may comprise standard well-known components such as an amplifier, filter, frequency-converter, (de)modulator, and encoder/decoder circuitries and one or more antennas.

The apparatus 800, 900 may also comprise user interface 840, 940 comprising, for example, at least one keypad, a microphone, a touch display, a display, a speaker, etc. The user interface 840, 940 may be used to control the respective apparatus by a user of the apparatus 800, 900.

In an embodiment, the apparatus 800 may be or be comprised in a UE, such as the UE 100 or 102.

According to an embodiment, the CTRL 810 comprises an transmission causing circuitry 812 configured at least to cause performing operations described with respect to block 210; a CHO command acquiring circuitry 813 configured at least to cause performing operations described with respect to block 220; a timer starting circuitry 814 configured at least to cause performing operations described with respect to block 230; a RLF detecting circuitry 815 configured at least to cause performing operations described with respect to block 240; and a signaling circuitry 816 configured at least to cause performing operations described with respect to block 250.

In an embodiment, the apparatus 900 may be or be comprised in a base station (also called a base transceiver station, a Node B, a radio network controller, an evolved Node B, or a g Node B, for example). The apparatus 900 may be the network node 104 or comprised in the network node 104, for example.

According to an embodiment, the CTRL 910 comprises a MR acquiring circuitry 912 configured at least to cause performing operations described with respect to block 310; a HO circuitry 913 configured at least to cause performing operations described with respect to block 320; a CHO command circuitry 914 configured at least to cause performing operations described with respect to block 330; a RLF circuitry 915 configured at least to cause performing operations described with respect to blocks 340, 345; and a condition controlling circuitry 916 configured at least to cause performing operations described with respect to block 350.

Regarding the condition controlling performed by the circuitry 910 and/or 916, it may comprise changing the condition(s) for Event 1 and/or Event 2. That is, condition for triggering the MR and/or for triggering the Event 2 TTT and detecting RLF if the condition for Event 2 TTT is still true at expiry of said TTT. The controlling may be performed at least on the condition that was determined to be misconfigured. For example, if the first condition was misconfigured, the first condition may be controlled such that the MR will be transmitted earlier. For example, if the second condition was misconfigured, the second condition may be controlled such that the Event 2 TTT will be triggered earlier. The network may indicate the controlled (i.e. changed) parameters to UEs in the cell. So, for example, the source cell may indicate the changed condition(s) to UEs within said source cell. Hence, the CHO process for other UEs in the cell may be enhanced. It is noted that the controlled conditions may be indicated in other cell(s) of the network depending on implementation details, for example.

In an embodiment, at least some of the functionalities of the apparatus 900 may be shared between two physically separate devices, forming one operational entity. Therefore, the apparatus 900 may be seen to depict the operational entity comprising one or more physically separate devices for executing at least some of the described processes. Thus, the apparatus 900 utilizing such shared architecture, may comprise a remote control unit (RCU), such as a host computer or a server computer, operatively coupled (e.g. via a wireless or wired network) to a remote radio head (RRH), such as a Transmission Point (TRP), located in a base station or network node 104, for example. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 7B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 7B or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 2 to 7B, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   upon detecting that a first condition is met at a terminal device, causing a transmission of a measurement report to a wireless network;
   acquiring a conditional handover command from the wireless network;
   upon detecting that a second condition, associated with the conditional handover command, is met, starting a handover execution timer for triggering execution of a handover from a source cell to a target cell, wherein handover is triggered at an expiry of the handover execution timer;
   detecting that a radio link failure condition is met before the execution of the handover is triggered by expiry of the handover execution timer; and
   on the basis of the detecting that the radio link failure condition is met, signaling, to the wireless network, information indicative of a cause of a conditional handover failure to be either a misconfiguration of the first condition or a misconfiguration of the second condition;
   wherein the information indicative of the cause of the conditional handover failure comprises timing information being indicative of a time period between the starting the handover execution timer and the acquiring the conditional handover command.

2. The method of claim 1, wherein one of:
   the cause of the conditional handover failure being the misconfiguration of the second condition is indicated by the time period being equal to or greater than a preconfigured threshold; or
   the cause of the conditional handover failure being the misconfiguration of the first condition is indicated by the time period being equal to or less than a preconfigured threshold.

3. The method of claim 1, wherein the information indicative of the cause of the conditional handover failure comprises an indicator indicating whether or not a first measurement performed by the terminal device, on the basis of the conditional handover command or after acquisition of the conditional handover command, causes starting the handover execution timer,
   and wherein the cause of the conditional handover failure being the misconfiguration of the first condition is indicated by said indicator if the first measurement performed by the terminal device causes starting the handover execution timer.

4. The method of claim 1, wherein the detecting that the radio link failure condition is met comprises detecting an expiry of a radio link failure related timer.

5. The method of claim 4, wherein the radio link failure related timer is started in response to detecting at least one out-of-sync event.

6. The method of claim 4, wherein the radio link failure related timer is started before acquiring the conditional handover command over a control plane.

7. The method of claim 1, wherein the timing information further indicates duration of the handover execution timer.

8. The method of claim 1, wherein the cause of the conditional handover failure being the misconfiguration of the first condition is indicated by the time period being equal to or less than a preconfigured threshold.

9. An apparatus comprising:
   at least one processor, and
   at least one memory comprising a computer program code, wherein the at least one memory and the computer program code are configured, with the at least one processor, to cause the apparatus at least to:
   upon detecting that a first condition is met, cause a transmission of a measurement report to a wireless network;
   acquire a conditional handover command from the wireless network;
   upon detecting that a second condition, associated with the conditional handover command, is met, start a handover execution timer for triggering execution of a handover from a source cell to a target cell, wherein handover is triggered at an expiry of the handover execution timer;

detect that a radio link failure condition is met before the execution of the handover is triggered by expiry of the handover execution timer; and on the basis of the detecting that the radio link failure condition is met, signal, to the wireless network, information indicative of a cause of a conditional handover failure to be either a misconfiguration of the first condition or a misconfiguration of the second condition;

wherein the information indicative of the cause of the conditional handover failure comprises timing information being indicative of a time period between the starting the handover execution timer and the acquiring the conditional handover command.

10. The apparatus of claim 9, wherein the detecting that the radio link failure condition is met comprises detecting an expiry of a radio link failure related timer.

11. The apparatus of claim 10, wherein the radio link failure related timer is started in response to detecting at least one out-of-sync event.

12. The apparatus of claim 10, wherein the radio link failure related timer is started before acquiring the conditional handover command over a control plane.

13. The apparatus of claim 9, wherein the timing information further indicates duration of the handover execution timer.

14. The apparatus of claim 9, wherein the cause of the conditional handover failure being the misconfiguration of the second condition is indicated by the time period being equal to or greater than a preconfigured threshold.

15. The apparatus of claim 9, wherein the cause of the conditional handover failure being the misconfiguration of the first condition is indicated by the time period being equal to or less than a preconfigured threshold.

16. The apparatus of claim 9, wherein the information indicative of the cause of the conditional handover failure comprises an indicator indicating whether or not a first measurement performed by the apparatus, on the basis of the conditional handover command or after acquisition of the conditional handover command, causes starting the handover execution timer, and wherein the cause of the conditional handover failure being the misconfiguration of the first condition is indicated by said indicator if the first measurement performed by the apparatus causes starting the handover execution timer.

17. A non-transitory computer program product embodied on a distribution medium readable by a computer and comprising program instructions which, when executed by an apparatus, cause the apparatus at least to:

upon detecting that a first condition is met, cause a transmission of a measurement report to a wireless network;

acquire a conditional handover command from the wireless network;

upon detecting that a second condition, associated with the conditional handover command, is met, start a handover execution timer for triggering execution of a handover from a source cell to a target cell, wherein handover is triggered at an expiry of the handover execution timer;

detect that a radio link failure condition is met before the execution of the handover is triggered by expiry of the handover execution timer; and on the basis of the detecting that the radio link failure condition is met, signal, to the wireless network, information indicative of a cause of a conditional handover failure to be either a misconfiguration of the first condition or a misconfiguration of the second condition;

wherein the information indicative of the cause of the conditional handover failure comprises timing information being indicative of a time period between the starting the handover execution timer and the acquiring the conditional handover command.

* * * * *